(12) United States Patent
Van Aken et al.

(10) Patent No.: US 8,510,474 B2
(45) Date of Patent: Aug. 13, 2013

(54) METHOD AND DEVICE FOR SUPPORTING A 6TO4 TUNNELING PROTOCOL ACROSS A NETWORK ADDRESS TRANSLATION MECHANISM

(75) Inventors: Dirk Van Aken, Ganshoren (BE); Elisabeth Lepoil, Chantepie (FR)

(73) Assignee: Thomson Licensing, Boulogne-Billancourt (FR)

( * ) Notice: Subject to any disclaimer, the term of this patent is extended or adjusted under 35 U.S.C. 154(b) by 800 days.

(21) Appl. No.: 10/534,616

(22) PCT Filed: Nov. 13, 2003

(86) PCT No.: PCT/EP03/12832
§ 371 (c)(1),
(2), (4) Date: Jul. 10, 2006

(87) PCT Pub. No.: WO2004/045183
PCT Pub. Date: May 27, 2004

(65) Prior Publication Data
US 2006/0259639 A1 Nov. 16, 2006

(30) Foreign Application Priority Data
Nov. 13, 2002 (EP) .................................. 02292825

(51) Int. Cl.
G06F 15/16 (2006.01)
H04J 3/16 (2006.01)
(52) U.S. Cl.
USPC .......................................... 709/246; 370/466

(58) Field of Classification Search
USPC .................................. 709/230; 370/466, 401
See application file for complete search history.

(56) References Cited

U.S. PATENT DOCUMENTS

| 2001/0040895 A1* | 11/2001 | Templin ........................ 370/466 |
| 2002/0062388 A1 | 5/2002 | Ogier et al. |
| 2002/0133607 A1* | 9/2002 | Nikander ...................... 709/229 |

FOREIGN PATENT DOCUMENTS

EP 1087575 3/2001

OTHER PUBLICATIONS

"Connection of IPv6 Domains via IPv4 Clouds", Network working Group, p. 1-23.
"Setup of 6to4 (NAT version)", Internet, 'online', pp. 1-3.
P. Srisuresh et al.: "RFC 2663-IP Network Address Translator (NAT) Terminology and Considerations"; RFC 2663, Aug. 1999, pp. 1-30.
W. Biemolt et al: "An overview of the introduction of IPv6 in the Internet", Jul. 2001, pp. 1-25.

* cited by examiner

Primary Examiner — Afshawn Towfighi
(74) Attorney, Agent, or Firm — Robert D. Shedd; Jerome G. Schaefer

(57) ABSTRACT

A method for supporting a 6to4 tunneling protocol across a network address translation mechanism. The method comprises the steps of receiving an outbound IPv6 packet encapsulated into an IPv4 packet, translating the private IPv4 source address in the IPv4 header of the outbound packet into a public IPv4 source address, transmitting the translated packet over the IPv4 network; and is characterized in that it further comprises the step of storing an association of the private IPv4 address and the Interface ID value of the 6to4 source address for opposite address translation of inbound packets. A corresponding device is also claimed.

6 Claims, 2 Drawing Sheets

ALG:
Inner & outer header adaptation
Look-up table maintenance

6to4 address prefix
(2002:V4ADDR::/48)

FP : Format prefix
TLA ID : Top Level Aggregator ID
V4ADDR : IPv4 address of the tunnel
SLA ID : Site Level Aggregator ID
Interface ID : Link Level Host identifier

METHOD AND DEVICE FOR SUPPORTING A 6TO4 TUNNELING PROTOCOL ACROSS A NETWORK ADDRESS TRANSLATION MECHANISM

This application claims the benefit, under 35 U.S.C. §365 of International Application PCT/EP03/12832, filed Nov. 13, 2003, which was published in accordance with PCT Article 21(2) on May 27, 2004 in English and which claims the benefit of European patent application No. 02292825.3, filed Nov. 13, 2002.

BACKGROUND OF THE INVENTION

The invention concerns a method and device for supporting a 6to4 tunneling protocol across a network address translation mechanism.

As described in the IETF documents RFC 1631, RFC 2663 and RFC 3022, Network Address Translation ('NAT') translates IPv4 addresses of a first address domain ('Private IPv4 addresses') into IPv4 addresses of a second address domain ('Public IPv4 addresses'). The translation is carried out on the source addresses of outgoing packets and on destination addresses of incoming packets going through the NAT. Typically, the NAT is a function integrated in a router, connecting for example two IPv4 networks using different and incompatible IP addressing schemes.

There exist two basic types of NAT: either the process consists in substituting addresses with a one-to-one correspondence (i.e. each first domain address is associated with a unique second domain address) or in associating several first domain addresses with a single second domain address. The first NAT type is referred to as 'N:N NAT' and the second type as 'X:Y NAT', in the context of this document.

A problem linked to the use of X:Y NAT is that if the NAT's translation table solely consists of IP address mapping information it will not allow to uniquely identify the source host, since during the translation, X private addresses where translated into Y public addresses (with Y<X), which results in a loss of information. Consequently, the NAT has to use additional session information in order to be able to make the opposite translation, and to support a bidirectional communication. But, there aren't any fields in the IP header of a packet to unambiguously identify a session so a "multiplexing/de-multiplexing identifier" (abbreviated as "multiplexing identifier further in this document) needs to be defined for each protocol running over IP. Protocols such as TCP and UDP have the notion of 'port' which is used by NAT to create look-up tables to make the backward translation possible. For applications that run over other IP transport protocols or directly on IP, dedicated session information has to be identified for each protocol. Alternatives have been proposed to make those "portless protocols" transparently crossing NAT. For instance, the document "Teredo: Tunneling IPv6 over UDP through NATs" by C. Huitema (Internet Draft of Sep. 17, 2002) describes an alternative method for providing services to IPv6 nodes located behind a NAT device. However, transporting IPv6 over UDP introduces an additional overhead and consequently has an influence on performance. Furthermore, additional specific servers have to be introduced into the network and the IPv6 hosts have to be upgraded.

Another alternative is described, in the document "Realm Specific IP: Framework" RFC 3102 of October 2001. However, as for the protocol described in the previous paragraph, additional servers are required and hosts need to be upgraded.

The document 'Setup of 6to4 (NAT version)' available from www.6to4.jp/settings/nat.html describes a NAT functionality in which the IPv4 address part of an 6to4 header of an IPv6 packet encapsulated in an IPv4 packet is updated with a public IPv4 address, resp. a private IPv4 address for outbound resp. inbound packets.

SUMMARY OF THE INVENTION

The invention concerns a method for supporting the 6to4 tunneling protocol (which is also a portless protocol), defined in RFC 3015, across NAT. The 6to4 protocol defines a mechanism for IPv6 sites to communicate with others IPv6 sites or with native IPv6 networks over an IPv4 network without explicit tunnel setup.

The method comprises the steps of:
receiving an outbound IPv6 packet encapsulated into an IPv4 packet,
translating the private IPv4 source address in the IPv4 header of the outbound packet into a public IPv4 source address,
transmitting the translated packet over the IPv4 network;
further comprising the step of:
storing an association of the private IPv4 address and the Interface ID value of the 6to4 source address for opposite address translation of inbound packets.

The value of the Interface Identifier is preserved by the destination host when sending back a response packet. It is used as a multiplexing identifier to enable the device to send the incoming packet to the right host, substituting the destination address with the previously stored address.

According to a particular embodiment of the invention, the method further comprises the steps of:
receiving an inbound packet over the IPv4 network;
determining whether the inbound packet encapsulates an IPv6 packet;
in the affirmative, retrieving the Interface ID of the encapsulated IPv6 packet's destination address, and using the Interface ID to retrieve the corresponding stored private IPv4 address, and updating the destination address in the IPv4 header accordingly;
forwarding the modified 6to4 packet on the first network.

According to a particular embodiment of the invention, the method further comprises the step of:
changing the IPv4 address part of the 6to4 source address in the IPv6 header of an outbound packet to the public IPv4 address.

According to a particular embodiment of the invention, the method further comprises the steps of:
changing the IPv4 address part of the 6to4 destination address of an inbound packet to the corresponding private IPv4 address FIG. 1 represents two IPv6 networks connected by an IPv4 network through respective routers. The left network router is connected to or integrates NAT, whether of the N:N NAT type or of the X:Y NAT type.

If, for example, in FIG. 1, Host 3 wishes to respond to a packet sent by Host 1, Host 3 will base the destination address of the response packet on the IPv6 source address contained in the IPv6 packet received from router r2. This IPv6 source address contains Host 1's private IPv4 address.

Router r2 builds the IPv4 header of the response packet from the IPv6 header of this packet; more precisely, the IPv4 destination address is extracted from the IPv6 destination address of Host 3 i.e the IPv4 destination address will be equal to Host1's private IPv4 address. The response packet will never be delivered (or it will be misrouted), because the private IPv4 address is not properly recognized on the IPv4 network.

This is solved by the above additional characteristic, according to which the inner IPv6 header of an outbound (6to4) packet is adapted to be coherent with the outer IPv4 header, as modified by the NAT process.

According to a particular embodiment of the invention, the method further comprises the step of modifying fields at least of the IPv4 header, such as checksums, whose values depend on the 6to4 source address.

According to a particular embodiment of the invention, the step of storing the association of the Interface ID and the source address of the 6to4 packets of the first network and the step of modifying the destination address of inbound packets as a function of the Interface ID, respectively the step of changing the IPv4 part of the 6to4 address are carried out by an application level gateway assisting the network address translation mechanism.

Another object of the invention is a device for supporting a 6to4 tunneling protocol across NAT, comprising:

a network address translation mechanism for changing the private source address of an outbound IPv4 packet encapsulating an IPv6 packet into a public source address;

further comprising an application for storing the private IPv4 addresses included in the 6to4 source address of a host of the IPv6 network, for outbound packets; and for updating the 6to4 destination address of an inbound packet with a stored private IPv4 address having same Interface ID as the 6to4 destination address.

According to an embodiment of the invention, the application is further adapted to carry out additional processing of an outbound packet, wherein the additional processing consists in replacing the private IPv4 address part of an 6to4 source address of an outbound packet with the device's public IPv4 address.

BRIEF DESCRIPTION OF THE DRAWINGS

Other characteristics and advantages of the invention will appear in the description of a non-restrictive embodiment, explained with the help of the enclosed drawings, among which.

DETAILED DESCRIPTION OF THE PREFERRED EMBODIMENT

Figure 1:
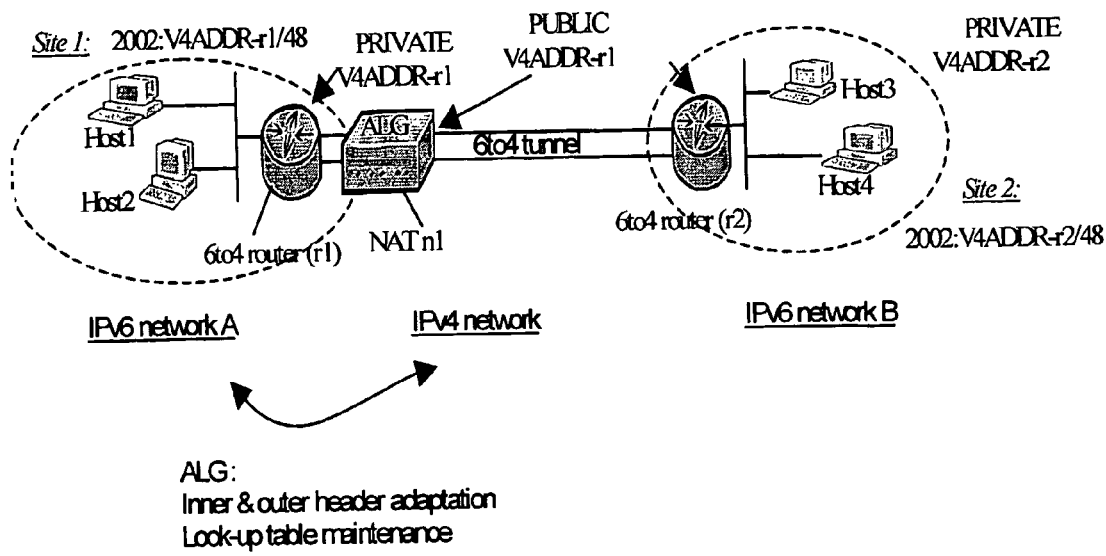
FIG. 1 is a diagram of two IPv6 networks connected through an IPv4 network using Network Address Translation (NAT) according to the embodiment of the invention.

FIG. 1 is a diagram of two IPv6 networks A and B connected through an IPv4 network. Network A comprises two hosts, resp. 1 and 2, connected to the IPv4 network through a 6to4 router r1. Similarly, network B comprises two hosts 3 and 4, as well as a 6to4 router r2. By placing IPv6/IPv4 border routers between the IPv6 networks and the IPv4 network, the isolated IPv6 clusters can be linked via so-called 6to4 tunnels.

Figure 2:
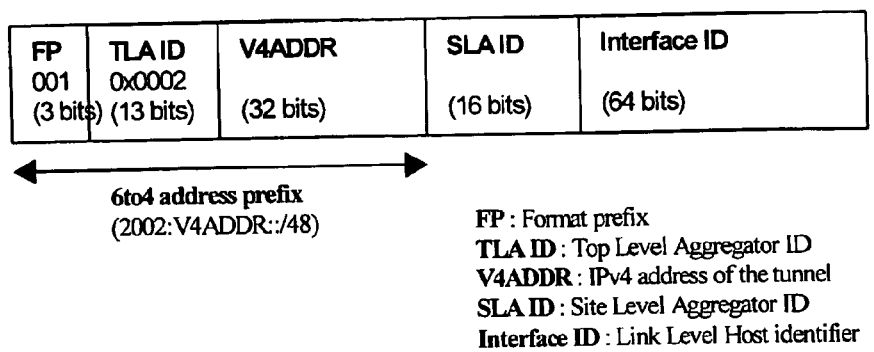
FIG. 2, which as such is prior art, is a diagram of the '6to4' address format.

FIG. 2 illustrates the IPv6 address format. Each IPv6 network is assigned a unique '6to4 format prefix', comprising a 3 bit format prefix ('FP'), a 13 bit predetermined identifier called the 'IPv6 Top Level Aggregator' ('TLA'), a globally unique IPv4 address ('V4ADDR'), a 16 bit Site Level Aggregator Identifier ('SLA ID') and lastly the 64-bit link level host identifier (Interface ID). The latter two identifiers form a host's locally unique identifier. The Interface ID is, for instance, the host's MAC address. It, can also be equal, for example, to the private, locally unique IPv4 address of the host.

Establishment of a tunnel by the 6to4 routers is conditioned by the use of predefined values for certain fields in the destination address of a packet. As described in RFC 3056 of February 2001, the concatenated FP and TLA fields have to have the value '2002'

The 6to4 address prefixes for networks A and B are respectively '2002:V4ADDR-r1/48' and '2002:V4ADDR-r2/48', where V4ADDR-r1 and V4ADDR-r2 are the globally unique IPv4 addresses assigned to the tunnel endpoints (router r1 and router r2, respectively).

Hosts of a IPv6 network are configured, or auto-configured via router advertisements, with IPv6 addresses composed of the 6to4 prefix assigned to the IPv6 network and the host's locally unique identifier (SLA/Interface ID).

Note that a 6to4 tunnel can also be defined directly between isolated 6to4 hosts without passing through a 6to4 router. In that case, the IPv4 address of the tunnel endpoint is the IPv4 address of the host.

Figure 3:
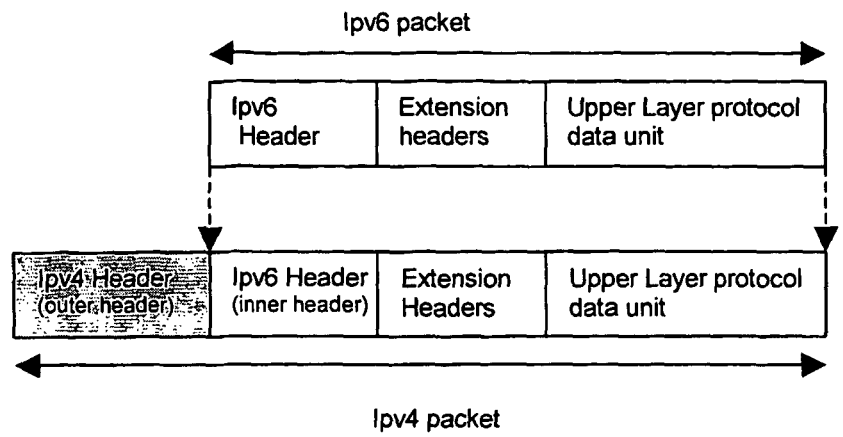
FIG. 3, which as such is prior art, is a diagram showing how an IPv6 packet is encapsulated into an IPv4 packet.

All packets on a IPv6 network having a destination address comprising a 6to4 prefix different from the network's 6to4 prefix are forwarded to the 6to4 border router. The router is responsible for encapsulating the IPv6 packets in IPv4 packets, as illustrated by FIG. 3. The IPv4 header of such a packet encapsulating IPv6 can be referred to as an 'outer' header, while the IPv6 header of the encapsulated IPv6 packet can be referred to as an 'inner' header. The IPv4 header contains the IPv4 source and destination addresses of the tunnel endpoints (i.e. the 'V4ADDR' addresses of the routers). The IPv6 header contains the IPv6 source and destination addresses of the hosts.

Encapsulated 6to4 packets received by the destination router are extracted, and the native IPv6 packets are forwarded to the proper host.

Figure 4:
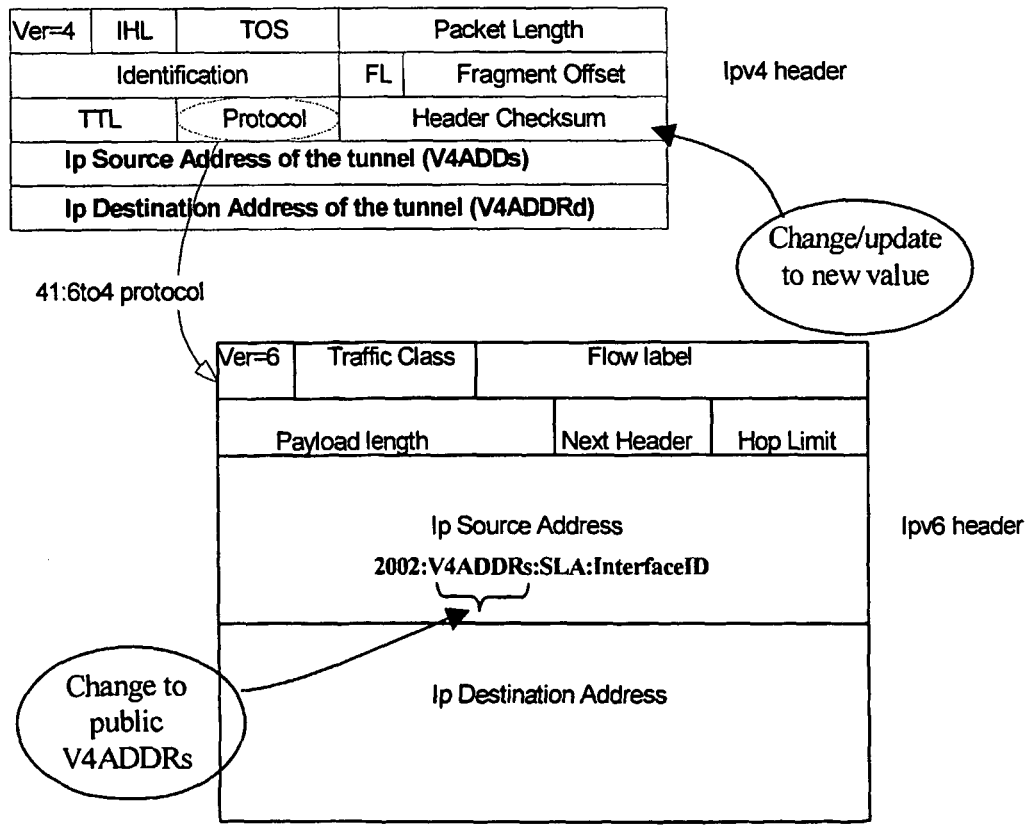
FIG. 4 is a diagram showing the modifications made to the IPv4 header and the encapsulated IPv6 header according to the embodiment.

FIG. 4 illustrates IPv4 and IPv6 headers in the present encapsulation scheme. For the 6to4 protocol, the 'protocol' field in the outer IPv4 header has value '41'. Further details concerning the contents of the IPv6 header fields can be found in RFC 2460. Note that the items labeled as 'changes' are amendments to the headers made according to the present embodiment.

While traditional N:N NAT and X:Y NAT operate only on the outer header of the packets (the IPv4 address in the inner header remains unchanged), the NAT according to the present embodiment also reflects the translation at the level of the inner header.

As illustrated by FIG. 1, according to the present embodiment, the NAT is assisted by an "Application Level Gateway" for the specific processing required for the 6to4 protocol. [.]As defined in RFC 2663, an ALG is an application-specific translation agent that allows an application on a host in one address realm to connected connect to its counterpart running on a host in a different realm. In the present example, the ALG is integrated into the router, along with the NAT.

The 6to4 ALG operates on packets sent by applications running over the 6to4 protocol. It detects the 6to4 prefix of packets and, for the detected packets, carries out the following processing:

(a) In the inner IPv6 header, replace the private IPv4 address ('V4ADDR') of the 6to4 prefix with the public IPv4 address for outgoing packets and vice versa for incoming packets.

(b) Update fields depending on the 6to4 prefix. In particular, checksums are concerned. This applies for example to the transport header checksums (e.g. the TCP or the UDP header). This applies also to any upper layer fields embedding the 6to4 prefix, such as it is the case in FTP (e.g. the whole prefix has to be replaced in the payload of an FTP packet (EPTR field)).

The coherence between the inner and the outer header is then restored. This solves the problem of incorrect packet delivery, in particular a response packet to a 6to4 packet going through a NAT functionality. The responding host, e.g. when Host 3 of FIG. 1 responds to Host 1, Router 2 will use the public IPv4 address in the modified 6to4 prefix to generate an IPv4 destination address for Host3 response packet. The response packet will then be correctly sent to router r1.

For the same reason, incorrect DNS records and wrongly populated forwarding databases and routing tables are avoided.

(c) According to the present embodiment, the 6to4 ALG further has the task of uniquely associating inbound and outbound traffic packets. The 6to4 ALG carries out the following processing. The NAT ALG maintains a list for mapping 6to4 destination addresses of inbound packets to the correct private 6to4 host address for packets returned by a remote host. It picks up a 'multiplexing identifier' from the outbound packets, in order to allow this mapping to be carried out.

According to the present embodiment, the multiplexing identifier is picked up from field(s) of the IPv6 header of the outbound packet. In fact, according to the present embodiment, an identifier already present in the IPv6 header is chosen as a multiplexing identifier. This identifier is chosen based on the characteristic that it is preserved by the remote host and unique on the originating network.

According to the present embodiment, the 'InterfaceID' field of the 6to4 source address is used as a unique identifier of the origin of an outbound packet by the 6to4 ALG. This field corresponds to the uniqueness and preservation criteria defined above. 'Preservation' does not mean that the identifier has to remain at the same location within the header, but simply that the 6to4 ALG will be able to recover it from a predetermined location in the header. In the present case, the remote host will of course swap the source and destination addresses in the response(s), so the location of the identifier within the header changes.

The 6to4 ALG consequently maintains a table having the following content:

TABLE 1

| InterfaceID | IPv4 address of the host having sent an outbound packet (source address of the outbound packet before translation by NAT) |
|---|---|
| ... | ... |

This table can also be stored under the form of a list of 6to4 addresses, since these addresses already contain the identifier.

The table is completed with a "6to4 entry" for each outbound session initiated from site 1. For each inbound packet, the 6to4 ALG will, based on the InterfaceID identifier in the destination address of the inbound packet, extract the corresponding private IPv4 address valid on the local network and replace the destination address in the inbound packet with this extracted value, before forwarding the packet on the local network.

A "6to4 entry" remains valid until the session timeout, managed by the NAT function, expires.

Although the present embodiment concerns IP addressing, the principles of the invention may be applied to other portless protocols, such as e.g. ICMP, ESP and GRE. The criteria of choice of the multiplexing identifier remain the same as those in the present embodiment. For ESP, the 'SPI' field can be used, while for GRE, the CallID field is appropriate.

The invention claimed is:

1. A method for supporting a 6to4 tunneling protocol across a network address translation mechanism comprising the steps of:

receiving from a first host located on a first network an outbound IPv6 packet encapsulated into an IPv4 packet, the IPv4 packet comprising a IPv4 header with a private IPv4 source address of the first host, the outbound IPv6 packet comprising a IPv6 header with a 6to4 source address, the IPv6 header comprising an Interface ID value, the Interface ID value being a multiplexing identifier that is a unique identifier associated with the first host;

translating the private IPv4 source address in the IPv4 header into a public IPv4 source address, transmitting the translated packet over an IPv4 network to a remote host;

storing an association between the private IPv4 source address and the Interface ID value of the 6to4 source address for opposite address translation of inbound packets returned by the remote host by deriving the multiplexing identifier from the outbound IPv4 packet; and further comprising the step of:

changing the private IPv4 address of the 6to4 source address in the IPv6 header of an outbound packet to the public IPv4 address; and changing the public IPv4 address of the 6to4 destination address of an inbound packet to a corresponding private IPv4 address.

2. The method according to claim 1, further comprising the steps of:

receiving an inbound packet over the IPv4 network;

determining whether the inbound packet encapsulates an IPv6 packet;

in the affirmative, retrieving the Interface ID of an encapsulated IPv6 packet's destination address, and using the Interface ID to retrieve a corresponding stored private IPv4 address, and updating the destination address in the IPv4 header accordingly;

forwarding the modified, encapsulated IPv6 packet on the first network.

3. The method according to claim 2, wherein the step of storing the association of the Interface ID and a source address of the encapsulated IPv6 packets of the first network and the step of modifying the destination address of inbound packets or the source address of outbound packets as a function of the Interface ID is carried out by an application level gateway assisting the network address translation mechanism.

4. The method according to claim 1, comprising the step of modifying fields at least of the IPv4 header, such as checksums, whose values depend on the 6to4 source address.

5. The method according to claim 1, wherein the step of changing the IPv4 part of the 6to4 address are carried out by an application level gateway assisting the network address translation mechanism.

6. A device for supporting a 6to4 tunneling protocol across a network address translation mechanism, comprising:
- a network address translation mechanism for changing a private source address of an outbound IPv4 packet encapsulating an IPv6 packet into a public IPv4 source address;
- further comprising an application for storing, for each outbound packet received from a host of an IPv6 network, an association between the private IPv4 addresses and an Interface ID value included in a 6to4 source address of a host, the Interface ID being a multiplexing identifier that is a unique identifier associated with the host and derived from each outbound packet, and for updating a 6to4 destination address of an inbound packet with a stored private IPv4 address having same Interface ID as the 6to4 destination address; and
- wherein the application is further adapted to carry out additional processing of an outbound packet, wherein the additional processing comprises replacing the private IPv4 address part of an 6to4 source address of an outbound packet with the device's public IPv4 address.

* * * * *